United States Patent
Ozaki et al.

(10) Patent No.: US 11,277,541 B2
(45) Date of Patent: Mar. 15, 2022

(54) SIGNAL CORRECTION DEVICE, IMAGE READING DEVICE, IMAGE PROCESSING APPARATUS, SIGNAL CORRECTION METHOD, AND COMPUTER PROGRAM PRODUCT

(71) Applicants: Tatsuya Ozaki, Kanagawa (JP); Hiroki Shirado, Kanagawa (JP)

(72) Inventors: Tatsuya Ozaki, Kanagawa (JP); Hiroki Shirado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/035,791

(22) Filed: Sep. 29, 2020

(65) Prior Publication Data

US 2021/0099614 A1   Apr. 1, 2021

(30) Foreign Application Priority Data

Sep. 30, 2019   (JP) ............. JP2019-181002

(51) Int. Cl.
| | |
|---|---|
| *H04N 1/40* | (2006.01) |
| *H04N 1/409* | (2006.01) |
| *H04N 1/00* | (2006.01) |
| *H04N 1/58* | (2006.01) |
| *H04N 1/60* | (2006.01) |

(52) U.S. Cl.
CPC ......... *H04N 1/409* (2013.01); *H04N 1/00013* (2013.01); *H04N 1/58* (2013.01); *H04N 1/6016* (2013.01); *H04N 2201/04781* (2013.01)

(58) Field of Classification Search
CPC combination set(s) only.
See application file for complete search history.

(56) References Cited

U.S. PATENT DOCUMENTS

| | | |
|---|---|---|
| 10,182,177 B2 | 1/2019 | Sasa et al. |
| 10,397,445 B2 | 8/2019 | Ozaki et al. |
| 2010/0027061 A1 | 2/2010 | Nakazawa |

(Continued)

FOREIGN PATENT DOCUMENTS

| | | |
|---|---|---|
| JP | 2010-212935 | 9/2010 |
| JP | 2012-065121 | 3/2012 |
| JP | 5444795 | 1/2014 |

OTHER PUBLICATIONS

Extended European Search Report dated Feb. 18, 2021 in European Patent Application No. 20198436.6, 7 pages.

*Primary Examiner* — Barbara D Reinier
(74) *Attorney, Agent, or Firm* — Xsensus LLP

(57) ABSTRACT

A signal correction device includes a correction signal generator configured to generate a correction signal serving to remove noise superimposed on an input signal; a phase adjuster configured to shift a phase of the correction signal generated by the correction signal generator; a subtractor configured to generate an output signal for output by subtracting the correction signal from the input signal; a peak and bottom detector configured to detect a peak value and a bottom value of the output signal; and a determiner configured to determine a phase-shift amount of the phase adjuster from the peak value and the bottom value of the output signal detected by the peak and bottom detector. The determiner detects uncorrected noise from the peak value and the bottom value of the output signal from the subtractor, and sets the phase-shift amount such that the uncorrected noise is reduced to a minimum.

16 Claims, 16 Drawing Sheets

(56) References Cited

U.S. PATENT DOCUMENTS

| | | |
|---|---|---|
| 2010/0177364 A1 | 7/2010 | Yoshigae |
| 2010/0231979 A1 | 9/2010 | Nagase et al. |
| 2012/0057211 A1 | 3/2012 | Shirado |
| 2012/0062962 A1 | 3/2012 | Nagase |
| 2014/0043629 A1 | 2/2014 | Shirado |
| 2016/0119495 A1 | 4/2016 | Konno et al. |
| 2016/0219163 A1 | 7/2016 | Shirado et al. |
| 2017/0019547 A1 | 1/2017 | Ozaki |
| 2017/0019567 A1 | 1/2017 | Konno et al. |
| 2018/0139345 A1 | 5/2018 | Goh et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2020/0120224 A1 | 4/2020 | Sasa et al. |
| 2020/0120225 A1 | 4/2020 | Oyama et al. |
| 2020/0120228 A1 | 4/2020 | Ozaki et al. |
| 2020/0137262 A1 | 4/2020 | Kubo et al. |
| 2020/0244837 A1 | 7/2020 | Tsukahara et al. |
| 2020/0252513 A1 | 8/2020 | Nakada et al. |
| 2020/0296255 A1 | 9/2020 | Hashimoto et al. |

FIRST UNCORRECTED NOISE > SECOND UNCORRECTED NOISE → DELAY CHANGE NECESSARY

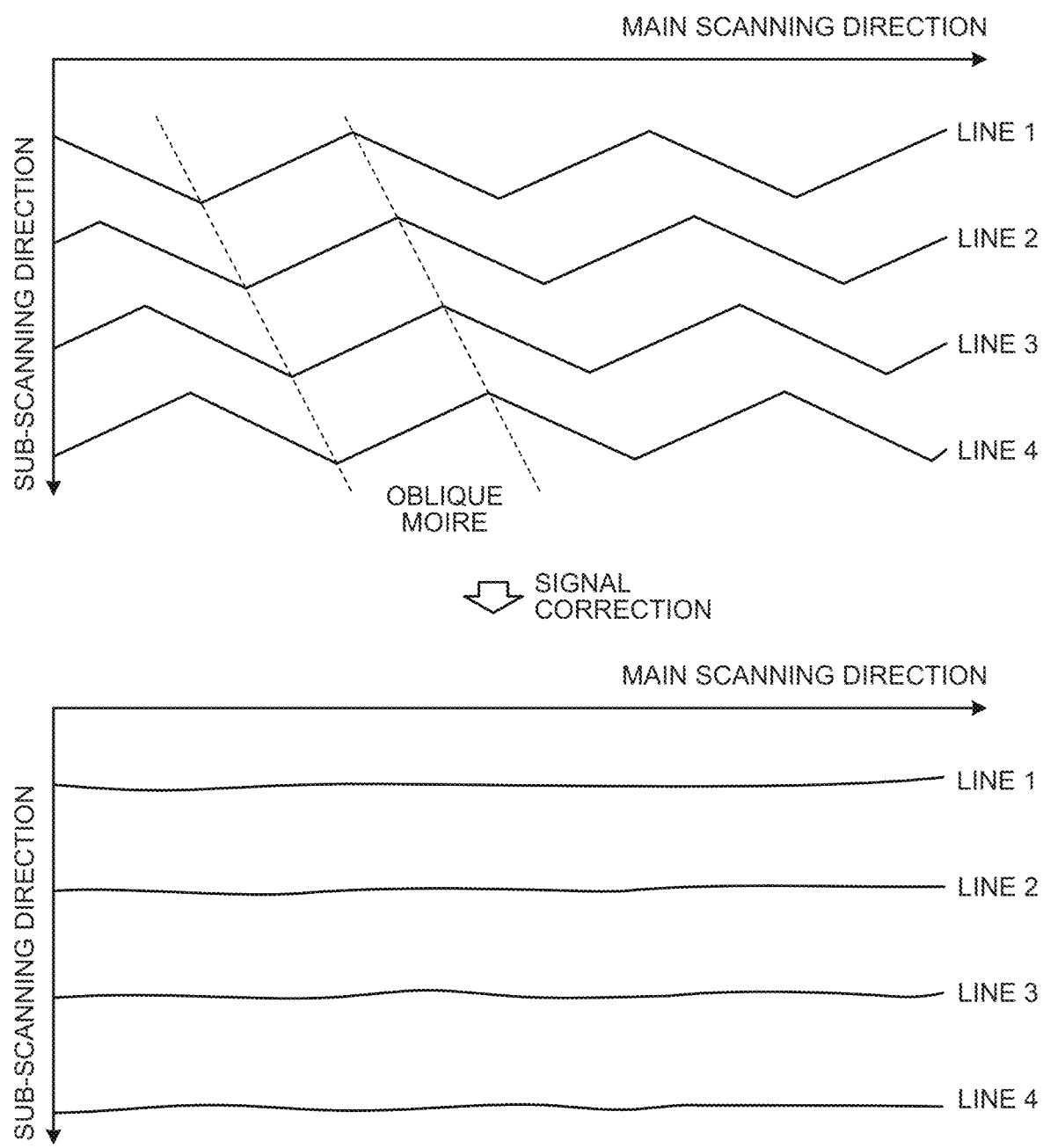

a: DIFFERENCE BETWEEN PEAK AND BOTTOM BEFORE CHANGE IN DELAY
b: DIFFERENCE BETWEEN PEAK AND BOTTOM AFTER CHANGE IN DELAY
c: AMOUNT OF CHANGE IN UNCORRECTED NOISE DUE TO CHANGE IN DELAY
d: WIDTH OF DISTURBANCE NOISE

FIG.18
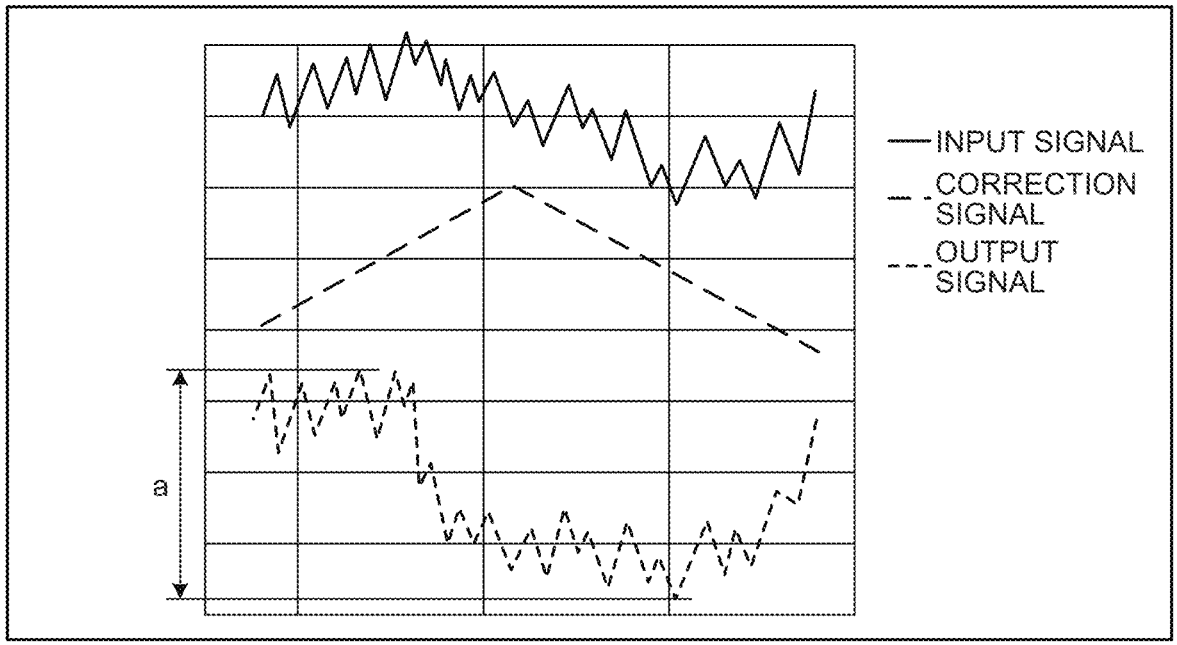
⇩ CHANGE DELAY SETTING VALUE BY ONE STEP
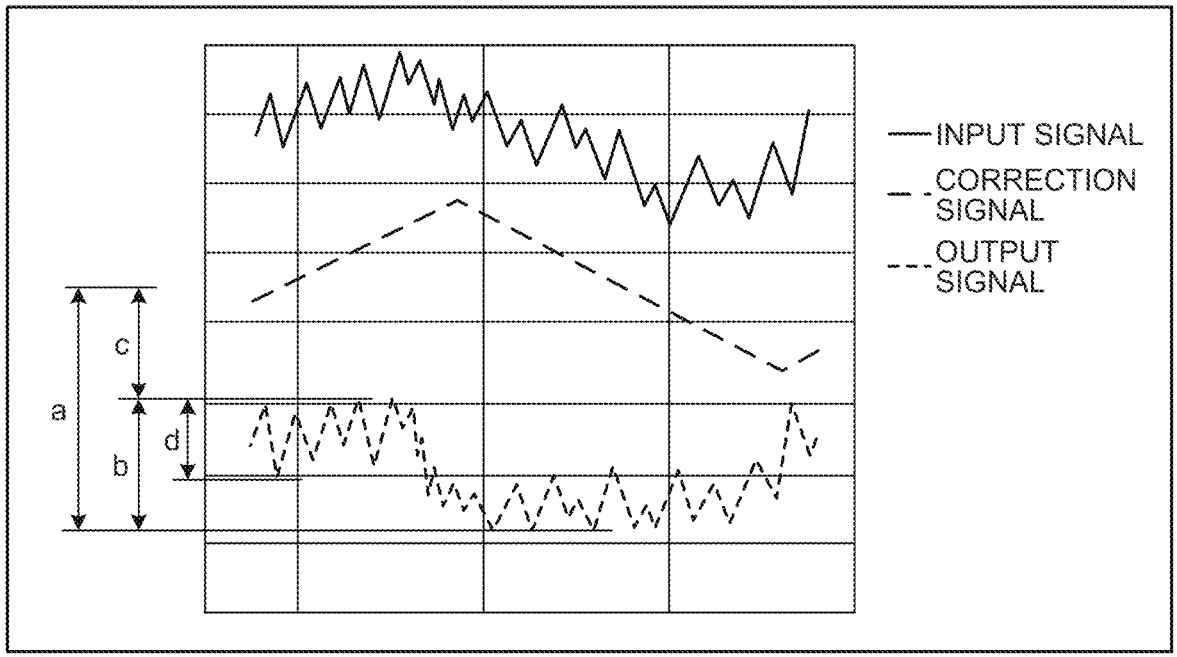
a: DIFFERENCE BETWEEN PEAK AND BOTTOM BEFORE CHANGE IN DELAY
b: DIFFERENCE BETWEEN PEAK AND BOTTOM AFTER CHANGE IN DELAY
c: AMOUNT OF CHANGE IN UNCORRECTED NOISE DUE TO CHANGE IN DELAY
d: WIDTH OF DISTURBANCE NOISE

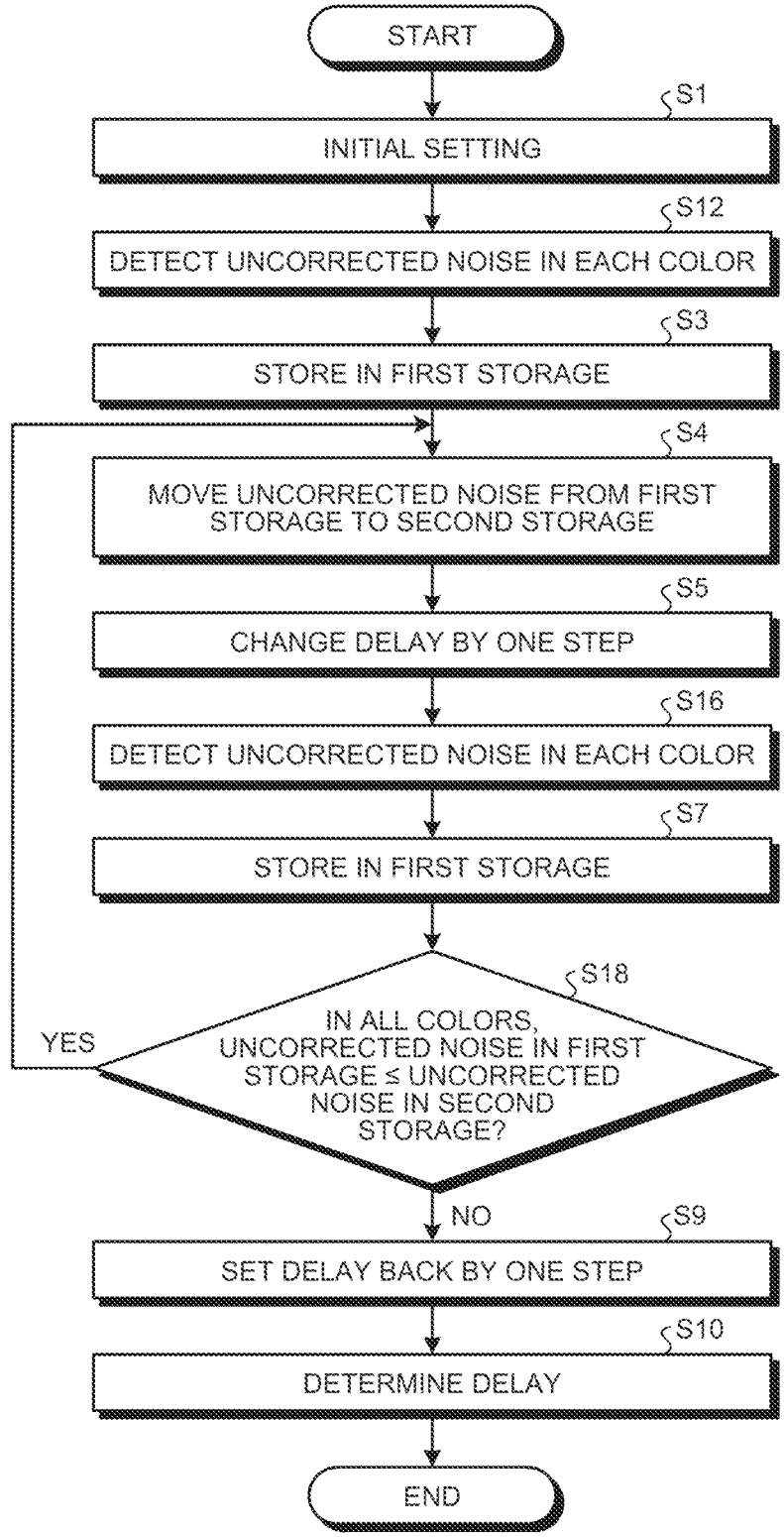

SIGNAL CORRECTION DEVICE, IMAGE READING DEVICE, IMAGE PROCESSING APPARATUS, SIGNAL CORRECTION METHOD, AND COMPUTER PROGRAM PRODUCT

CROSS-REFERENCE TO RELATED APPLICATIONS

The present application claims priority under 35 U.S.C. § 119 to Japanese Patent Application No. 2019-181002, filed on Sep. 30, 2019. The contents of which are incorporated herein by reference in their entirety.

BACKGROUND OF THE INVENTION

1. Field of the Invention

The present invention relates to a signal correction device, an image reading device, an image processing apparatus, a signal correction method, and a computer program product.

2. Description of the Related Art

In recent years, various image reading devices have been requested to improve in image quality and processing speed. Typically, along with an increase in image reading rate, a clock signal to drive an image sensor or an image processing IC increases in frequency, increasing unintended electromagnetic radiation. In view of this, a spread spectrum clock generator (SSCG) is known, which modulates the frequency of a clock signal to reduce unintended radiation intensity.

Applying SSCG to an image reading device, however, may cause a side effect that the image varies in level in synchronization with a modulation period and the image appears as moire or a tripe pattern. A method of preventing the image from deteriorating in quality due to the side effect is available, which includes adding, to a digital image signal, a correction signal generated from digital data serving as a modulation profile of a clock signal, to thereby remove noise, superimposed and synchronized with a modulation period, from the digital image signal.

For example, a technique of automatically and appropriately adjusting the polarity and amplitude of a correction signal for appropriately correcting SSCG noise is disclosed (in Japanese Patent No. 5444795, for instance).

Such a conventional technique, however, adjusts the correction signal in polarity and amplitude but not in phase. Because of this, a delay due to the characteristics of a signal processing IC may change because of temperature or over time, which may cause a variation in phase shift between noise superimposed on a signal to correct and the correction signal. In this case, initially correctable noise may become no longer corrected, which may cause deterioration of the image quality. Further, the phase cannot be easily re-adjusted, therefore, the user may be forced to use the image reading device with the deteriorated image quality.

SUMMARY OF THE INVENTION

According to one aspect of the present invention, a signal correction device includes a correction signal generator configured to generate a correction signal serving to remove noise superimposed on an input signal; a phase adjuster configured to shift a phase of the correction signal generated by the correction signal generator; a subtractor configured to generate an output signal for output by subtracting the correction signal from the phase adjuster from the input signal; a peak and bottom detector configured to detect a peak value and a bottom value of the output signal; and a determiner configured to determine an amount of phase shift of the phase adjuster from the peak value and the bottom value of the output signal detected by the peak and bottom detector. The determiner detects uncorrected noise from the peak value and the bottom value of the output signal from the subtractor, and sets the amount of phase shift such that the uncorrected noise is reduced to a minimum.

BRIEF DESCRIPTION OF THE DRAWINGS

FIG. 12 is a diagram illustrating an influence of a correction by the signal correction device;

FIG. 18 is a diagram illustrating a decrease in influence of disturbance noise by amplification of a correction signal; and FIG. 19 is a flowchart illustrating phase adjustment of a correction signal by a signal correction device according to a third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
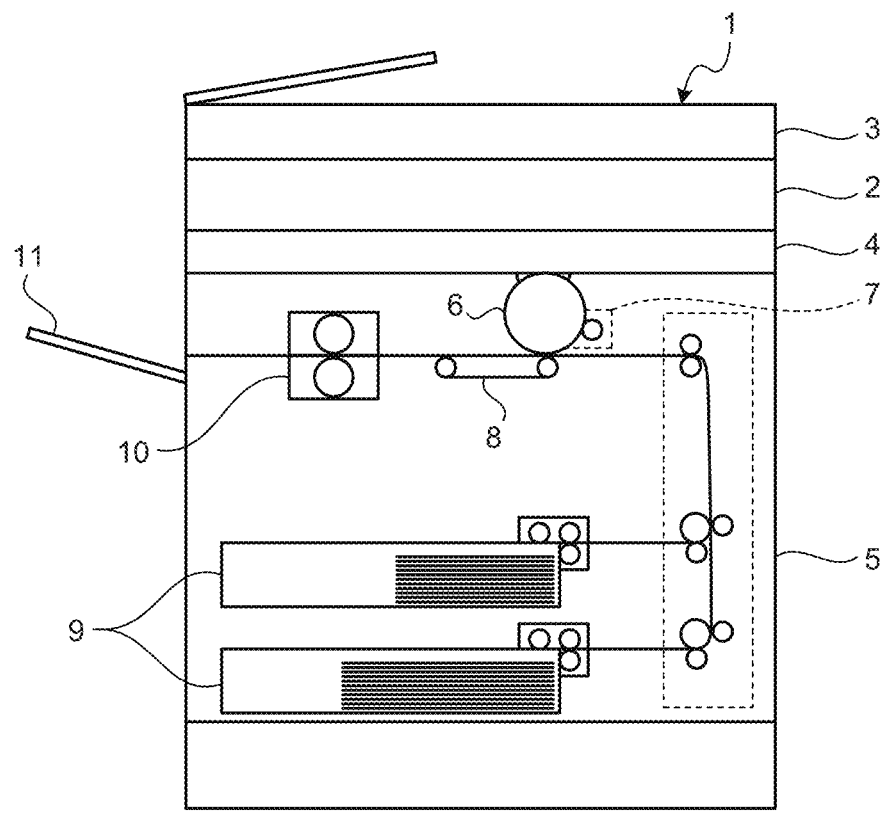
FIG. 1 is a schematic cross-sectional view illustrating a structure of an image forming apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide a signal correction device which can accurately correct noise in a signal to correct, irrespective of a change in phase shift between noise superimposed on the signal and a correction signal due to the influence of temperature or over time.

An embodiment of the present invention will be described in detail below with reference to the accompanying drawings.

With reference to the accompanying drawings, embodiments of a signal correction device, an image reading device, an image processing apparatus, a signal correction method, and a computer program product will be described in detail below.

First Embodiment

FIG. 1 is a schematic cross-sectional view illustrating a structure of an image forming apparatus 1 according to a first embodiment.

The image forming apparatus 1 functions as an image processing apparatus and is, for example, a digital multi-function peripheral including a copy function, a printer function, a scanner function, and a facsimile function. The image forming apparatus 1 includes an image reading device or a scanner 2. With a switch key of an application on an operation unit (not illustrated in FIG. 1), the image forming apparatus 1 can be selectively switched among the copy function, the printer function, the scanner function, and the facsimile function when appropriate. The image forming apparatus 1 is placed in a copy mode while the copy function is selected, is placed in a scanner mode while the scanner function is selected, and is placed in a facsimile function while the facsimile mode is selected.

The image forming process of the image forming apparatus 1 in the copy mode will be briefly described with reference to FIG. 1, by way of example. In the copy mode, an automatic document feeder 3 sequentially feeds a bundle of documents to the image reading device 2 and the image reading device 2 reads image information therefrom. A writing unit 4 converts the read image information into optical information via an image processor (not illustrated in FIG. 1). A printer unit 5 serves as an image forming unit and includes a photosensitive drum 6. The photosensitive drum 6 is electrically charged uniformly by a charger (not illustrated in FIG. 1) and is exposed on the basis of the optical information from the writing unit 4, to form an electrostatic latent image thereon. The electrostatic latent image on the photosensitive drum 6 is developed into a toner image by a developing device 7. The toner image is then transferred onto a sheet of paper fed by a conveyance belt 8 from a paper feeding cassette 9. The toner image transferred onto the sheet of paper is fixed by a fixing device 10 and is ejected to an ejected paper tray 11.

The image reading device 2 reads an image from the document with a charge coupled device (CCD: linear image sensor) 25 (refer to FIG. 2), and converts an analog image signal into a digital image signal.

Figure 2:
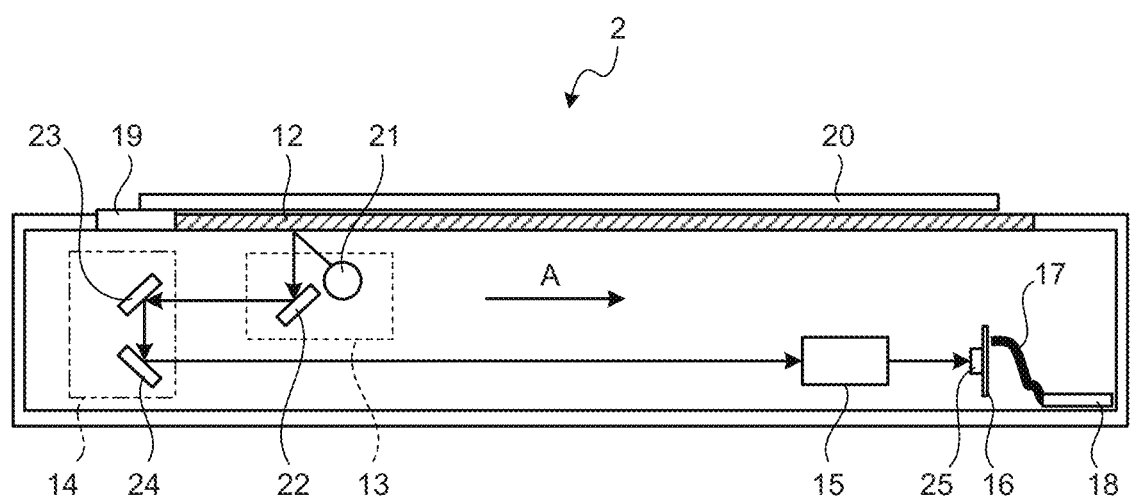
FIG. 2 is a schematic diagram illustrating a structure of an image reading device.

FIG. 2 is a schematic diagram illustrating a structure of the image reading device 2. The image reading device 2 includes a contact glass 12, a first carriage 13, a second carriage 14, a lens unit 15, a sensor board 16, a signal cable 17, an image processor 18, and a white reference board 19.

A document 20 is set on the contact glass 12. The first carriage 13 includes a xenon lamp 21 for exposing the document and a first reflective mirror 22. The second carriage 14 includes a second reflective mirror 23 and a third reflective mirror 24. For scanning, a stepping motor (not illustrated in FIG. 2) drives the first carriage 13 and the second carriage 14 to move in a sub-scanning direction A. The image of the document is irradiated by the xenon lamp 21 and is transmitted to the lens unit 15 via the first reflective mirror 22, the second reflective mirror 23, and the third reflective mirror 24. The lens unit 15 forms the image of the fed document on the CCD (CCD linear image sensor) 25.

The image reading device 2 of the first embodiment employs a differential mirror system in which the first carriage 13 moves rightward under the document at a speed V and the second carriage 14 moves at a speed V/2 to scan the document while maintaining the optical path length constant. However, the image reading device 2 is not limited thereto. For example, the image reading device 2 may employ an integrated scanning optical unit incorporating a lens, an illuminator, a mirror, and an image sensor in a united manner, and the entire unit scans to read a document.

The sensor board (signal processing circuit) 16 generates an analog image signal from the image of the document read by the CCD 25 and converts the analog signal into a digital signal. The sensor board 16 includes a signal processing circuit including the CCD 25.

Figure 3:
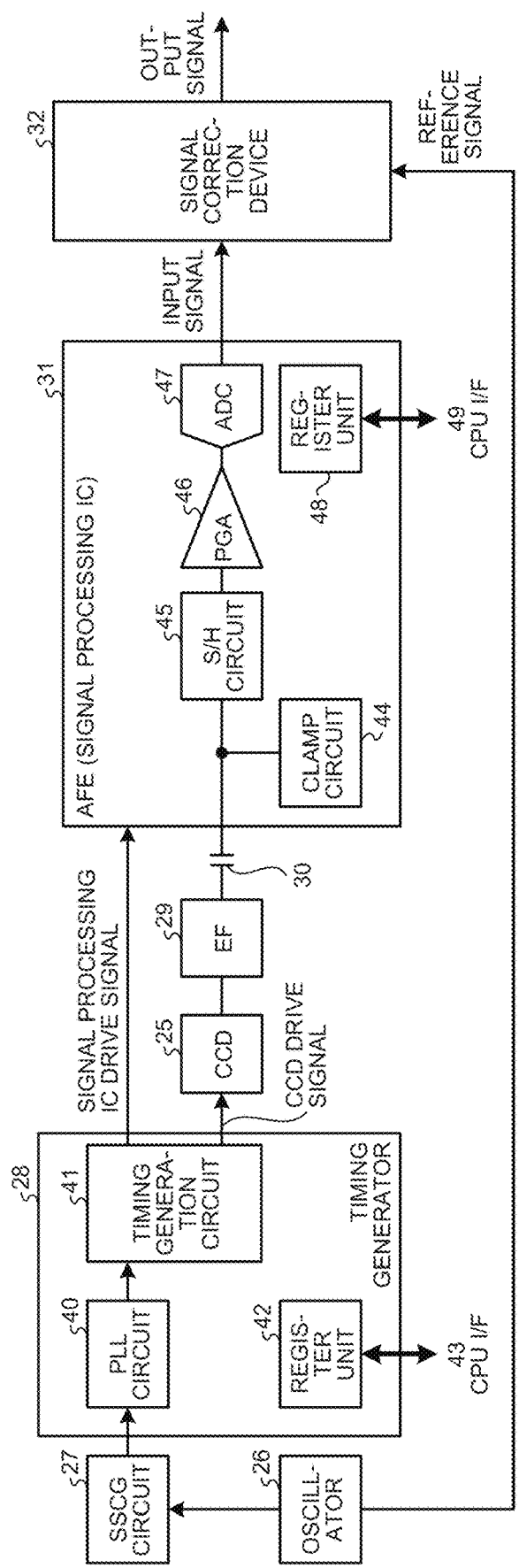
FIG. 3 is a block diagram illustrating a signal processing circuit included in a sensor board.

FIG. 3 is a block diagram illustrating the signal processing circuit included in the sensor board 16. The sensor board 16 includes an oscillator 26, a spread spectrum clock generator (SSCG) circuit 27, a timing generator 28, a CCD 25, an emitter follower (EF) circuit 29, an AC coupling capacitor 30, an AFE (signal processing IC) 31, and a signal correction device 32.

The signal processing circuit is not limited to the one illustrated in FIG. 3. For example, the AFE (signal processing IC) 31 may include the SSCG circuit 27, the timing generator 28, and the signal correction device 32.

The oscillator 26 outputs a clock signal serving as a reference signal and includes a crystal oscillator. To take a countermeasure against deterioration in properties due to electromagnetic interference (EMI), the SSCG circuit 27 modulates the frequency or spreads the spectrum of a clock signal output by the oscillator 26. Specifically, the SSCG circuit 27 integrally flattens the EMI spectrum through the frequency modulation of the operation clock within a minute range in a slow cycle.

The timing generator 28 represents an integrated circuit (IC) including a PLL circuit 40, a timing generation circuit 41, and a register unit 42 that are integrated, and generates, from the frequency-modulated clock signal, drive clocks for drive signals serving to drive the CCD 25, the AFE 31, and the signal correction device 32.

The PLL circuit 40 multiplies the frequency-modulated clock signal to a desired frequency. The timing generation circuit 41 divides the frequency of the multiplied clock signal to generate a CCD drive signal and generate drive clocks for a CCD drive signal to drive the CCD 25, a signal processing IC drive signal to drive the AFE 31, and a drive signal to drive the signal correction device 32. The CCD drive signal is output to the CCD 25, the signal processing IC drive signal is output to the AFE 31, and the drive signal is output to the signal correction device 32. Each drive clock is adjustable in pulse width and phase in a unit of multiplied clock in the PLL circuit 40.

The register unit 42 stores an operation setting for the timing generator 28 and various conditions. The settings of the register unit 42 are made by an external CPU via a CPU I/F 43 at the time of power-on. The CPU is mainly incorporated in the image processor 18.

The CCD 25 is a photoelectric conversion element that reads the light reflected by the document and converts the light into an electric signal, i.e., analog image signal. An emitter-follower circuit 29 performs impedance matching between the CCD 25 and the AC coupling capacitor 30. The AC coupling capacitor 30 lowers the offset voltage such that the voltage of the analog image signal output from the CCD 25 falls within the range of rated input voltages of the AFE 31.

The AFE 31 is a signal processing IC including a clamp circuit 44, a sample hold (S/H) circuit 45, a programmable gain amplifier (PGA) 46, an AD converter (ADC) 47, a register unit 48, and a black offset correction circuit (not illustrated in FIG. 3) in an integrated manner. One of important functions of the AFE 31 is to convert the analog image signal input to the AFE 31 to a digital image signal.

The clamp circuit 44 maintains the level of the input analog image signal at a desired constant voltage level. The sample hold circuit 45 samples the analog image signal using a sample pulse being one of signal processing IC drive signals and maintains the signal level, to generate a continuous analog image signal. The programmable gain amplifier 46 amplifies the analog image signal at a given amplification factor. The AD converter 47 converts the analog image signal to a digital image signal and outputs the digital image signal to the signal correction device 32.

The register unit 48 stores an operation setting for the AFE 31 and various conditions. The setting of the register unit 48 is made by an external CPU via a CPU I/F 49 at the time of power-on. The CPU is generally incorporated in the image processor 18. The black offset correction circuit sets a black level serving as a reference of image signals to a desired output.

The signal correction device 32 receives the digital image signal (input signal) from the AFE 31 and removes noise superimposed on the digital image signal.

The signal correction device 32 is implemented by, for example, a control device's, such as a central processing unit (CPU), executing a software program stored in a storage device, such as a read only memory (ROM) or a random access memory (RAM).

The computer program that implements the signal correction device 32 of the first embodiment is recorded and provided in an installable or executable file format on a computer-readable recording medium, such as a CD-ROM, a flexible disk (FD), a CD-R, or a digital versatile disk (DVD).

The computer program that implements the signal correction device 32 of the first embodiment may be stored in a computer connected to a network such as the Internet, and provided, being downloaded via the network. Alternatively, the computer program that implements the signal correction device 32 of the first embodiment may be provided or distributed via a network, such as the Internet. Alternatively, the computer program that implements the signal correction device 32 of the first embodiment may be incorporated in advance in a ROM, for example.

The signal correction device 32 may be partially or entirely implemented not by a software program but by hardware circuitry, such as a field-programmable gate array (FPGA) or an application specific integrated circuit (ASIC).

Figure 4:
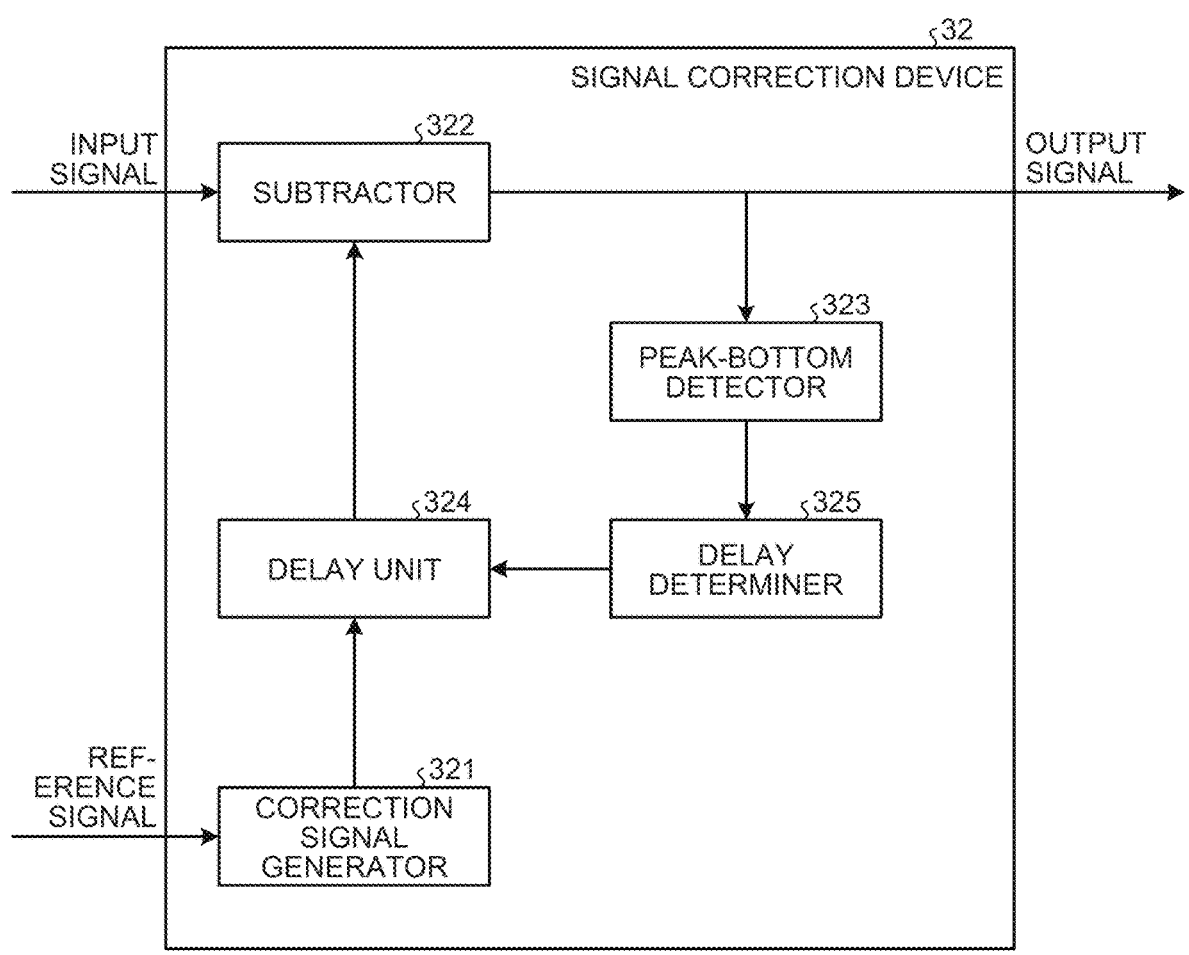
FIG. 4 is a block diagram illustrating a functional configuration of a signal correction device.

FIG. 4 is a block diagram illustrating a functional configuration of the signal correction device 32. As illustrated in FIG. 4, the signal correction device 32 includes a correction signal generator 321, a subtractor 322, a peak and bottom detector 323, a delay unit 324 serving as a phase adjuster, and a delay determiner serving as a determiner. The signal correction device 32 is, for example, provided for each of three colors (red, green, and blue) of the CCD (CCD linear image sensor) 25.

The correction signal generator 321 generates a correction signal for removing superimposed noise from the input signal and outputs the correction signal to the delay unit 324.

The delay unit 324 shifts the phase of the correction signal generated by the correction signal generator 321 for output to the subtractor 322. The subtractor 322 generates an output signal by subtracting the correction signal from the delay unit 324 from the input signal, and then outputs the output signal.

The peak and bottom detector 323 detects a peak value and a bottom value of the output signal and outputs the peak value and the bottom value as a feedback signal to the delay determiner 325.

The delay determiner 325 determines a delay, i.e., amount of phase shift, of the delay unit 324 from the peak value and the bottom value of the output signal detected by the peak and bottom detector 323.

In the signal correction device 32, the correction signal generator 321 receives a reference signal from the oscillator 26, for example, to generate a correction signal on the basis of the reference signal, the delay unit 324 shifts the generated correction signal in phase, and inputs the correction signal to the subtractor 322. The subtractor 322 of the signal correction device 32 then corrects the noise by subtracting the correction signal from the input signal and outputs the resultant signal as an output signal.

Figure 5:
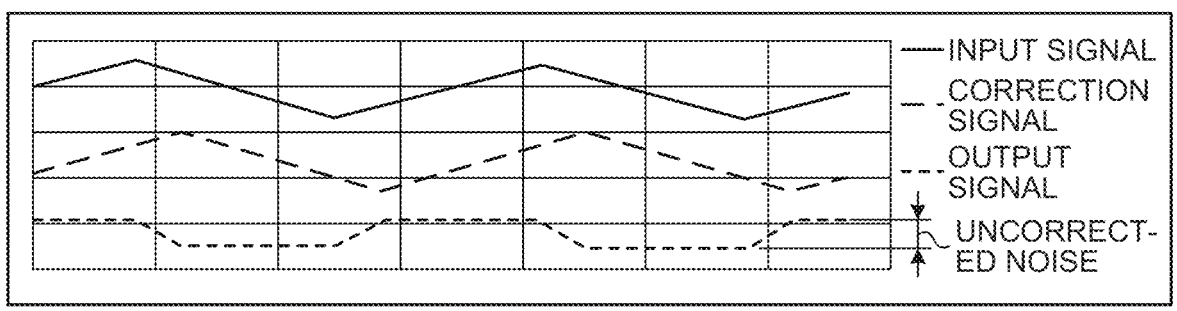
FIG. 5 is a diagram illustrating an example of uncorrected noise in a relationship in phase between noise superimposed on an input signal and a correction signal.

FIG. 5 is a diagram illustrating an example of uncorrected noise in a relationship in phase between noise superimposed on an input signal and a correction signal. As illustrated in FIG. 5, a phase shift between noise superimposed on an input signal and a correction signal causes uncorrected noise remaining in an output signal.

For this reason, the peak and bottom detector 323 of the signal correction device 32 detects the peak value and the bottom value of the output signal and detects uncorrected noise from the peak value and the bottom value as detected. The delay determiner 325 of the signal correction device 32 determines a delay for shifting the phase of the correction signal such that the uncorrected noise is reduced to a minimum.

Figure 6:
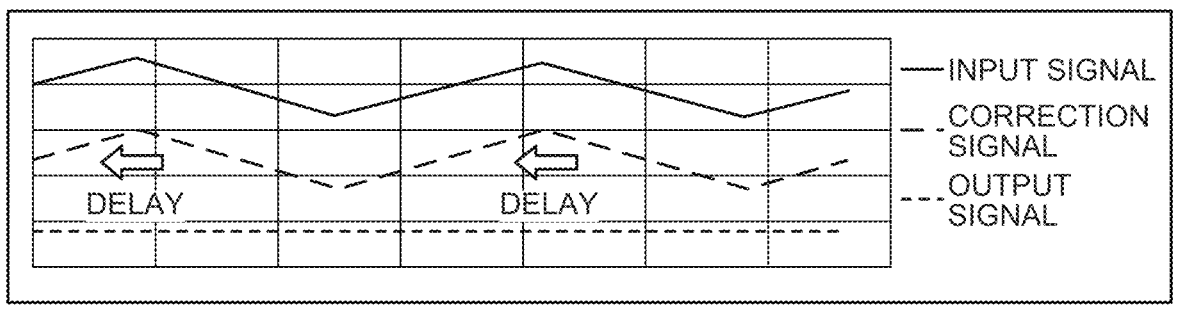
FIG. 6 is a diagram illustrating an example of a result of a correction when delay is adjusted in conformity with uncorrected noise.

FIG. 6 is a diagram illustrating an example of a result of a correction when adjusting the delay in conformity with uncorrected noise. As illustrated in FIG. 6, the signal correction device 32 delays, with the delay unit 324, the correction signal for phase shift in accordance with the delay determined by the delay determiner 325. FIG. 6 illustrates noise and a corresponding correction signal in a triangle waveform for the sake of simple explanation. The noise and the correction signal can be in another waveform.

A phase adjustment method by the delay unit 324 will be described.

Figure 7:
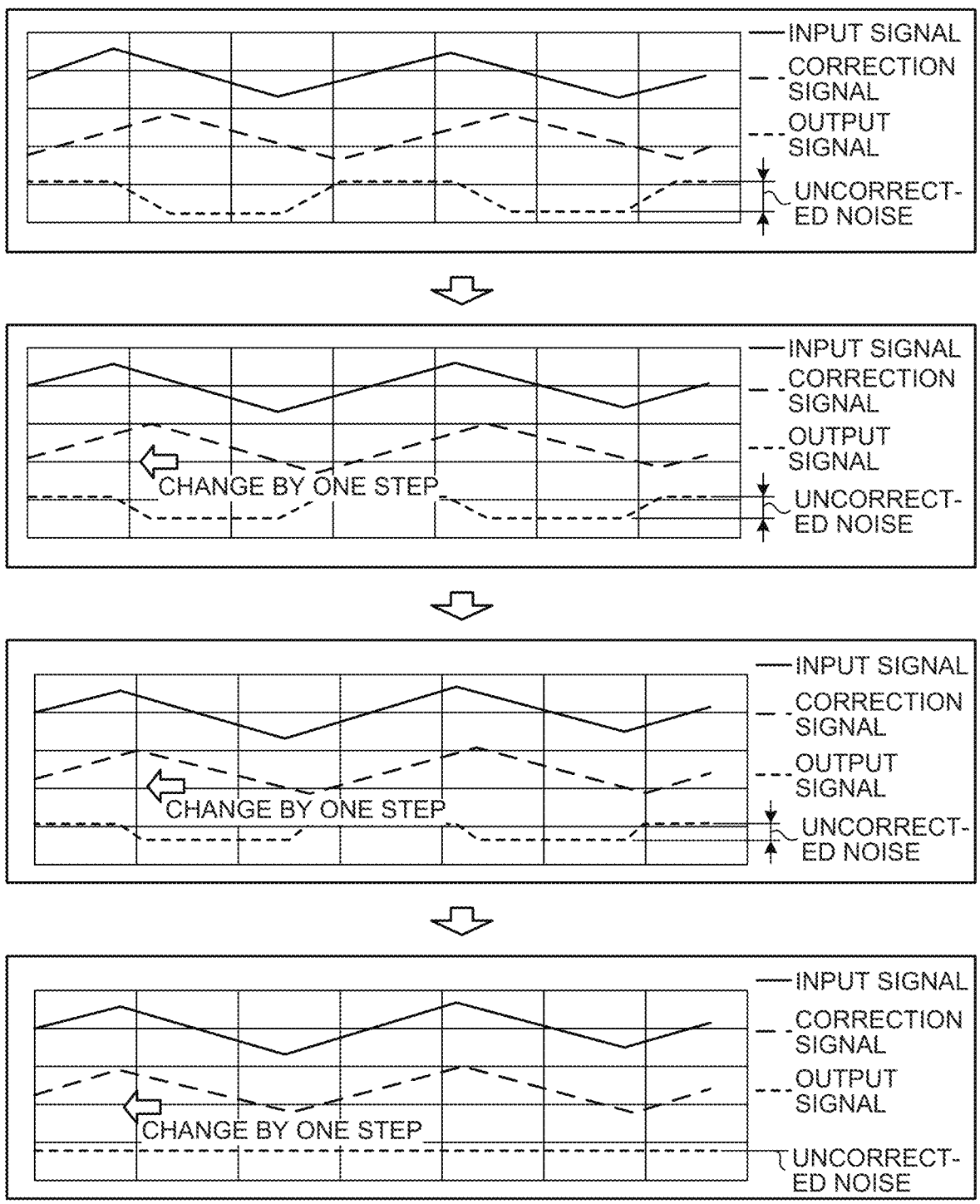
FIG. 7 is a diagram illustrating an example of a phase adjustment by a delay unit.

FIG. 7 is a diagram illustrating an exemplary phase adjustment by the delay unit 324. As illustrated in FIG. 7, the delay unit 324 adjusts the correction signal in phase by changing the delay in unit of a step of a pre-set width to delay the phase of the correction signal. This makes it possible to adjust the phase setting while checking the uncorrected noise when appropriate, which ensures that the phase is set to minimize the amount of noise. This enables accurate noise correction.

In the case of adjusting a signal in amplitude prior to in phase, the amplitude adjustment may not be appropriate, which may cause the relationship between increase and decrease in the amplitude of the correction signal and decrease in the amount of noise to be non-linear, therefore, the amount of variation may not fall within an intended error range. In the case of a phase adjustment prior to an amplitude adjustment, the correction signal is set to an appropriate amplitude sufficient to see a change in the amount of noise due to a change in the phase. Because of this, at the time of phase adjustment, the amount of noise after the correction may be increased so that the amount of variation may not fall within an intended error range.

In order to solve such a situation, the delay determiner 325 compares the amounts of noise before and after the change in the phase setting, thereby reducing the uncorrected noise to a minimum after each phase setting.

Figure 8:
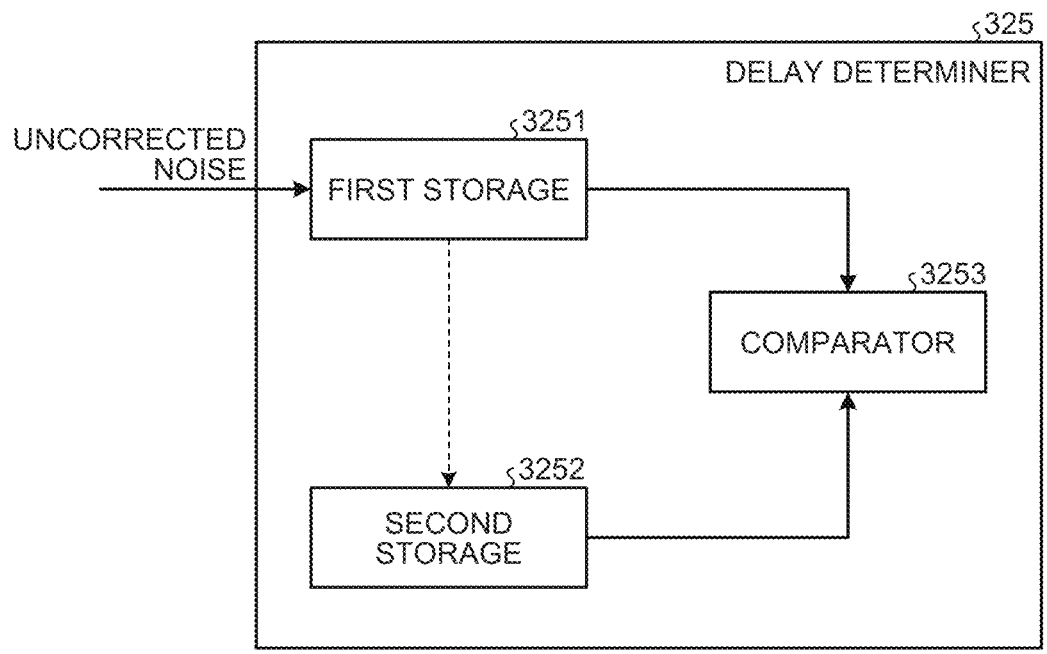
FIG. 8 is a block diagram illustrating a functional configuration of a delay determiner.

FIG. 8 is a block diagram illustrating a functional configuration of the delay determiner 325. As illustrated in FIG. 8, the delay determiner 325 includes a first storage 3251, a second storage 3252, and a comparator 3253. In other words, the delay determiner 325 includes the first storage 3251 and the second storage 3252 for each of the three colors.

The first storage 3251 stores uncorrected noise after a change of the delay (first uncorrected noise) to be described below.

The second storage 3252 stores uncorrected noise before the change of the delay (second uncorrected noise) to be described below.

The comparator 3253 compares the first uncorrected noise stored in the first storage 3251 and the second uncorrected noise stored in the second storage 3252 with each other. In other words, the delay determiner 325 determines whether to change the amount of phase shift or delay of the correction signal for each color.

Figure 9A:
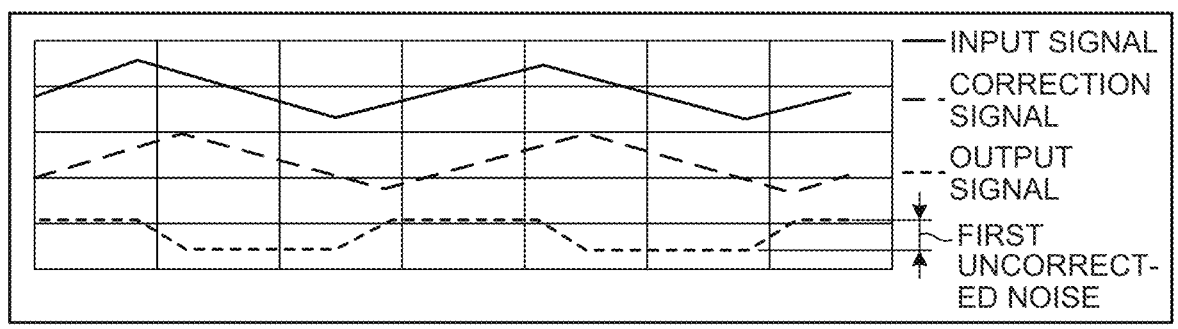
FIGS. 9A and 9B are diagrams illustrating an example of determining to change the delay.
Figure 9B:
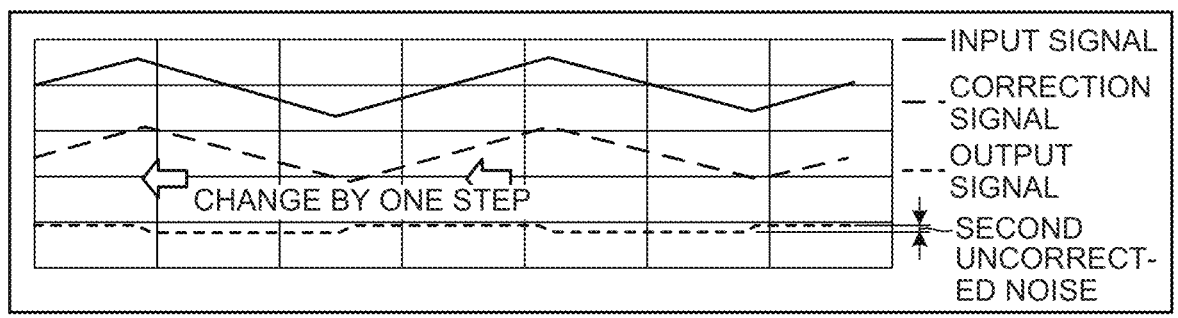

After comparator 3253 determines that the first uncorrected noise in the first storage 3251 is larger, the delay determiner 325 determines to change the delay. FIGS. 9A and 9B are diagrams illustrating an example of determining to change the delay. As illustrated in FIGS. 9A and 9B, the first uncorrected noise stored in the first storage 3251 is larger than the second uncorrected noise stored in the second storage 3252.

Figure 10A:
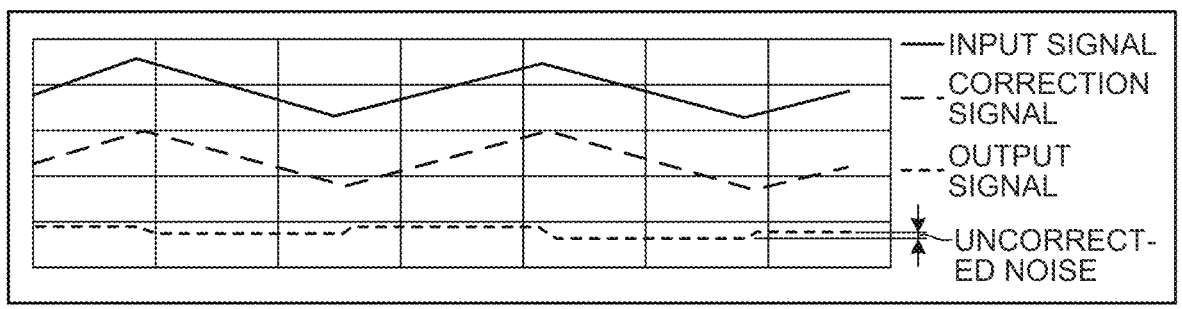
FIGS. 10A and 10B are diagrams illustrating an example of determining not to change the delay.
Figure 10B:
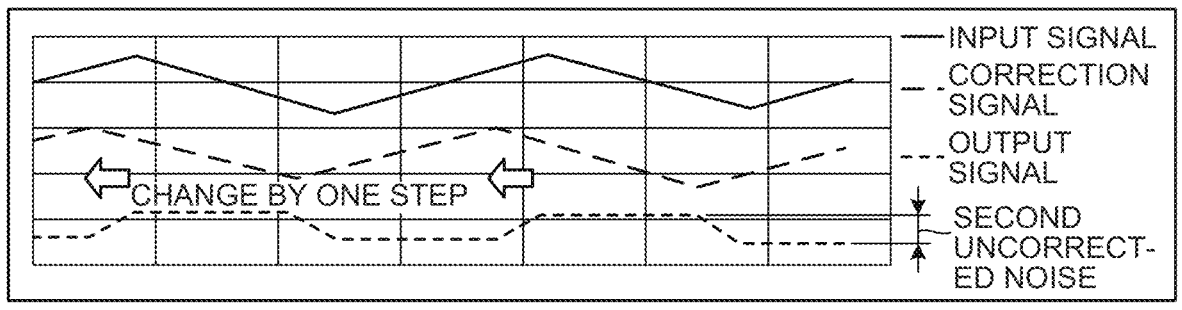

Meanwhile, after comparator 3253 determines that the second uncorrected noise in the second storage 3252 is larger, the delay determiner 325 determines not to change the delay. FIGS. 10A and 10B are diagrams illustrating an example of determining not to change the delay. As illustrated in FIGS. 10A and 10B, the second uncorrected noise stored in the second storage 3252 is larger than the first uncorrected noise stored in the first storage 3251.

Figure 11:
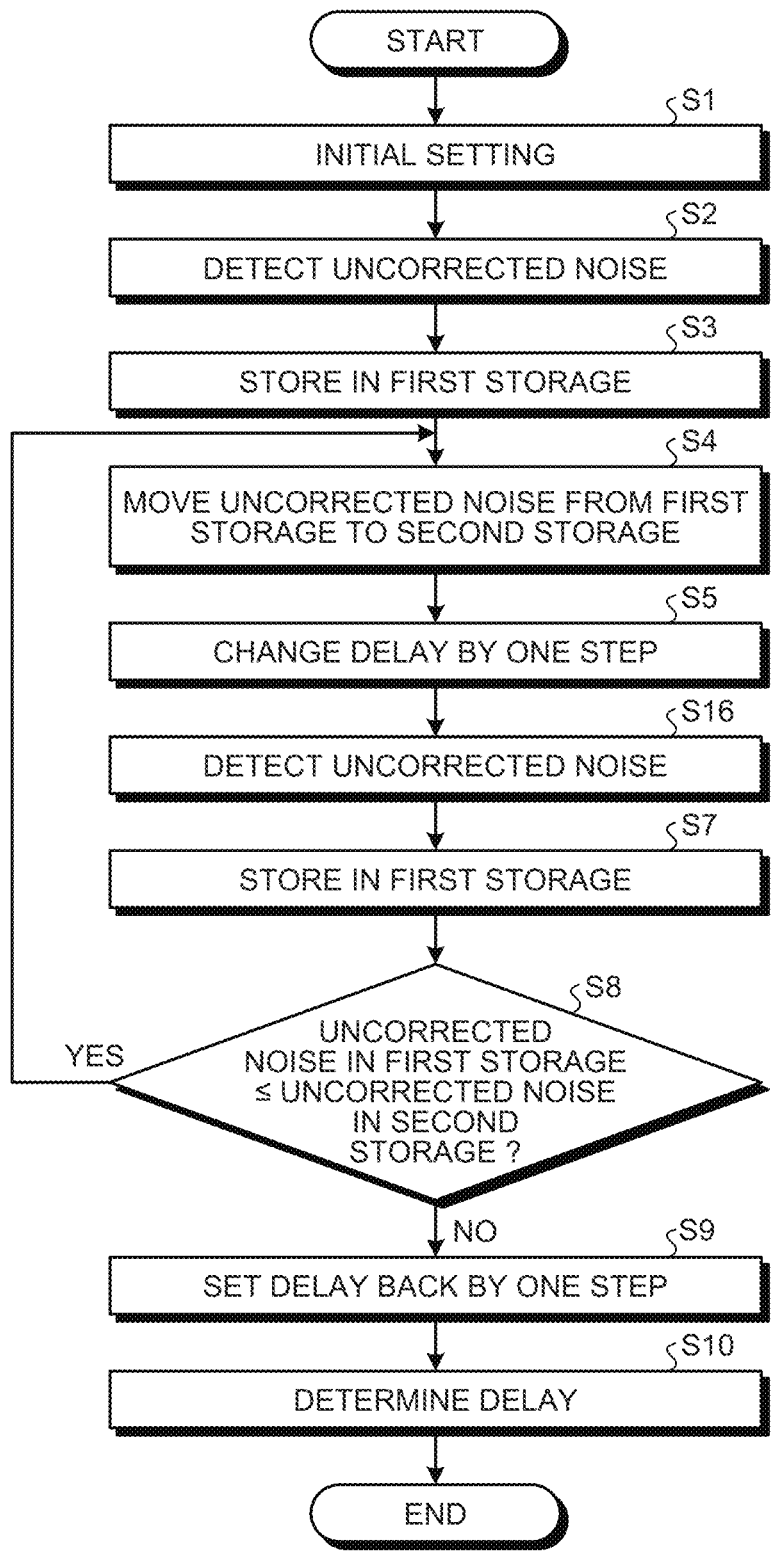
FIG. 11 is a flowchart illustrating phase adjustment of a correction signal by a signal correction device.

FIG. 11 is a flowchart illustrating a phase adjustment of a correction signal by the signal correction device 32. As illustrated in FIG. 11, after making an initial setting (step S1), the signal correction device 32 detects uncorrected noise using the peak and bottom detector 323 (step S2) and stores the uncorrected noise as first uncorrected noise in the first storage 3251 (step S3).

The signal correction device 32 then transfers the first uncorrected noise from the first storage 3251 to the second storage 3252 and set the uncorrected noise as second uncorrected noise (step S4).

The signal correction device 32 then changes the delay by one step using the delay unit 324 (step S5).

The signal correction device 32 detects uncorrected noise using the peak and bottom detector 323 (step S6) and stores the uncorrected noise as first uncorrected noise in the first storage 3251 (step S7). In other words, the first uncorrected noise refers to uncorrected noise after a change of the delay. The second uncorrected noise refers to uncorrected noise before a change of the delay.

Using the comparator 3253, the signal correction device 32 then compares the first uncorrected noise stored (uncorrected noise after a change of the delay) in the first storage 3251 and the second uncorrected noise (uncorrected noise before a change of the delay) stored in the second storage 3252 (step S8). In other words, at step S8, the signal correction device 32 makes a determination as to whether to attempt to further change the delay.

After the comparator 3253 determines that the second uncorrected noise in the second storage 3252 is smaller than or equal to the first uncorrected noise (the first uncorrected noise the second uncorrected noise) (NO at step S8), the signal correction device 32 determines not to change the delay.

After determining not to change the delay, the signal correction device 32 returns the delay setting to the previous setting (step S9) and determines the setting as the final delay setting value using the delay determiner 325 (step S10).

Meanwhile, after the comparator 3253 determines that the first uncorrected noise in the first storage 3251 is smaller (the second uncorrected noise>the first uncorrected noise) (YES at step S8), the signal correction device 32 determines to change the delay.

After determining to change the delay, the signal correction device 32 returns to step S4, transfers the first uncorrected noise from the first storage 3251 to the second storage 3252, and changes the delay by one step using the delay unit 324 (step S5).

The signal correction device 32 then detects uncorrected noise using the peak and bottom detector 323 (step S6), stores the uncorrected noise as first uncorrected noise in the first storage 3251 (step S7), and makes a comparison again using the comparator 3253 (step S8).

As described above, comparing the first uncorrected noise and the second uncorrected noise before and after the change in the phase setting makes it possible to reduce the uncorrected noise to a minimum after each phase setting and enables an accurate phase adjustment irrespective of improper amplitude adjustment.

FIG. 12 is a diagram illustrating an influence of a correction by the signal correction device 32. In the image reading device 2 including the SSCG circuit 27, the analog timing generation circuit 41 uses a SSCG-modulated clock signal, therefore, the offset voltage level of an image sensor output waveform varies in synchronization with the SSCG modulation of the clock signal. This may cause a periodical variation and a difference in level of the image signal, read from an image with uniform density level, in one main scanning line. Along with a variation in the signal level in a very short period due to high-frequency noise superimposed on the waveform of the image signal, for example, the sampling point of the image signal varies in synchronization with SSCG modulation, resulting in sampling a part of the image signal at a different signal level due to the noise and leading to the same situation as above. Through repetition of the variation in a large number of lines, as illustrated in the upper drawing of FIG. 12, the difference in pixel level appears as vertical moire and/or oblique moire in the read image.

Meanwhile, as illustrated in the lower drawing of FIG. 12, the signal correction device 32 of the first embodiment is capable of correcting the image to the one including no apparent oblique moire by, for example, correcting the difference in level in one line resulting from SSCG.

As described above, according to the first embodiment, the signal correction device 32 detects uncorrected noise from an output signal corrected by a correction signal to set a delay of the correction signal such that the uncorrected noise is reduced to a minimum. Thereby, the signal correction device 32 can automatically adjust the phase to an appropriate setting according to noise behavior and appropriately correct superimposed noise from a signal to correct irrespective of a change in phase shift between the noise and the correction signal due to the influence of temperature or over time.

In the first embodiment, the delay unit 324 performs phase adjustment by changing the delay in unit of a step of a pre-set width so as to delay the correction signal in phase. However, the phase adjustment is not limited thereto. As illustrated in FIG. 7, adjusting a large amount of phase shift by changing the delay in unit of a step (by minimum unit) may results in elongating the amount of time to complete the adjustment.

In the first embodiment, particularly, it is preferable to perform phase adjustment at the time of power-on of the device or immediately before a certain operation, for the purpose of correcting a change in the phase of noise due to the influence of temperature or over time.

Specifically, upon power-on of the image reading device 2, the control board runs and the elements on the control board starts generating heat. The temperatures of the elements are affected and differ by the surrounding environment such as a difference in season, a difference in humidity, and the installed location of the device such as indoor or outdoor. The temperature differences among the elements may change the state of phase of noise superimposed on the image signal.

During scanning by the image reading device 2, the elements to drive the CCD 25 and the other elements generate heat. The elements gradually rise in temperature during successive scanning and vary in temperature upon each scanning. As for the automatic document feeder (ADF), particularly, in successive scanning the automatic document feeder scans documents without stop, so that the elements are continuously driven, greatly increasing in the temperature. Such a temperature change in the elements may cause a change in the state of phase of noise superimposed on the image signal.

To reduce power consumption during no use, the recent image reading devices 2 mostly transition to an energy-saving mode during a non-operating period. In the energy-saving mode, the image reading device 2 stops operations of irrelevant elements for saving power. The image reading device 2 generally recovers from the energy saving mode to a standby mode. However, there may a situation that in response to a scan command, for example, the image reading device 2 recovers from the energy-saving mode to a scanning operation before the temperatures of the elements reach the normal temperatures in a stand-by state. In that case, the temperature condition of each element may be different from that in the stand-by state after the power-on. This may cause a change in the phase state of noise superimposed on an image signal.

As described above, it is preferable for the signal correction device 32 of the first embodiment to correct the correction signal at certain timing, for example, each time the image reading device is powered on, each time the image reading device performs scanning, or each time the image reading device recovers from the energy-saving mode to the stand-by mode. This makes it possible to correct, in response to a change in the state of phase of noise superimposed on an image signal, the correction signal in accordance with the change, and accurately correct the noise. Further, in response to a change in the state of phase of noise superimposed on an image signal caused by continuous heat generation of the elements, the signal correction device 32 can correct the correction signal in accordance with the change and accurately correct the noise.

In response to a change in the state of phase of noise superimposed on an image signal caused by a temperature change in the elements due to recovery from the energy-saving mode to the stand-by mode, the signal correction device 32 can correct the correction signal in accordance with the change and accurately correct the noise.

However, correcting the correction signal upon every power-on, every scanning, or every recovery from the energy-saving mode to the stand-by mode of the image reading device may elongate the length of time taken for the power-on of the device and the start of operation, lowering usability.

Figure 13A:
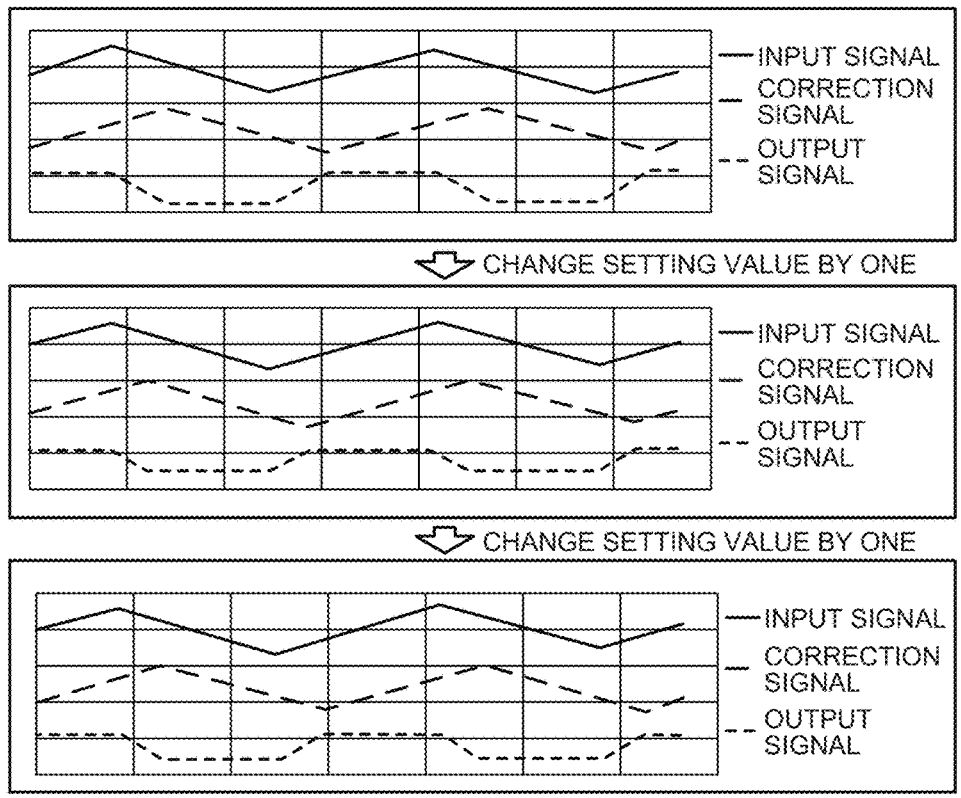
FIGS. 13A and 13B are diagrams illustrating variations in delay setting.
Figure 13B:
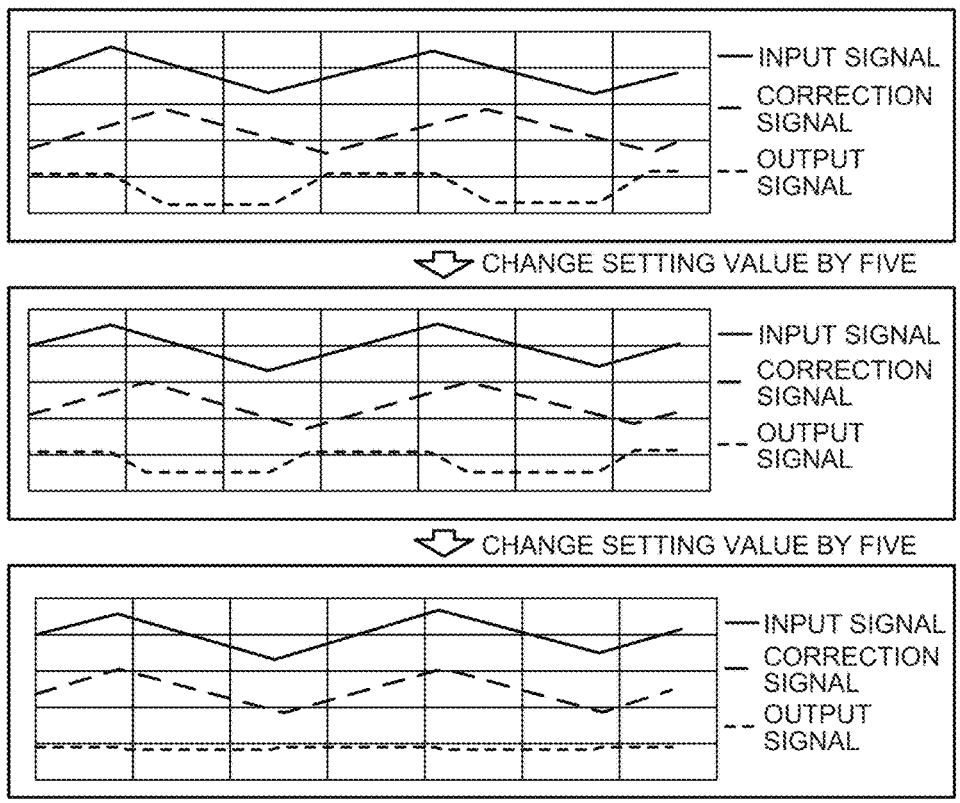

In view of this, at the time of changing the delay setting, the delay may be shifted in a step width twice as large as or larger than the minimum unit of the setting value (minimum setting value). FIGS. 13A and 13B are diagrams illustrating variations in delay setting. As illustrated in FIG. 13A, for example, in the case of the initial phase shift having a value of 10, incrementing the delay setting in unit of one step requires eleven-time repetitions of the process of changing the setting, acquiring uncorrected noise, and comparison and determination. Meanwhile, as illustrated in FIG. 13B, changing the delay setting in unit of five steps requires three-time repetitions of the series of process, making it possible to significantly shorten the adjustment time.

Figure 14:
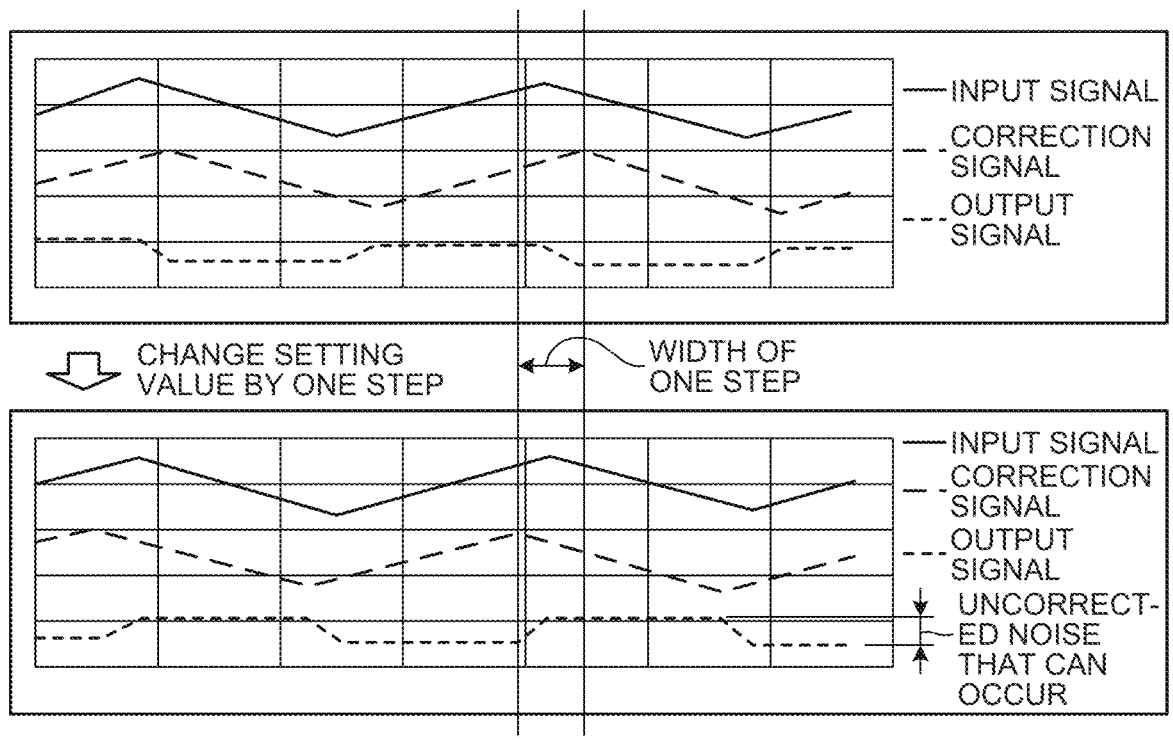
FIG. 14 is a diagram illustrating an example of changing the delay by one step from a phase shift corresponding to half of a step width.

Changing the setting value by a certain step width as described above may cause a remaining phase shift corresponding to half of the step width at maximum. FIG. 14 is a diagram illustrating an example of changing the delay by one step from a phase shift corresponding to half of a step width. In the example illustrated in FIG. 14, the uncorrected noise caused by a one-step shift is approximately equal to the uncorrected noise before the shift and thus the uncorrected noise remains after the final adjustment. For this reason, it is preferable to set the step width to a maximum setting value or less in the allowable range of the uncorrected noise caused by the remaining phase shift.

This makes it possible to correct the uncorrected noise in an allowable level while reducing the phase adjustment time to a minimum.

Alternatively, repeatedly incrementing and decrementing the delay while narrowing the step width makes it possible to find optimum delay setting. For example, the amount of the final uncorrected noise is decreased by gradually narrowing the step width in the order of 5, 4, 3, 2 and 1 upon changing the delay. For another example, after determining not to change the delay, the step width is narrowed from 5 to 4 and then the delay is set back by one step, and after determining not to change the delay again, the step width is narrowed from 4 to 3 and then the delay is set by one step further.

Such a changing method of the delay may elongate the phase adjustment time than that of the method described referring to FIGS. 13 and 14. It is thus preferable to select the most effective method in consideration of an allowable adjustment time and intended adjustment accuracy.

The input signal to the signal correction device 32 of the first embodiment may be other than the output signal of the AD converter (ADC) 47 as long as the input signal is a digital signal. For example, the AFE 31 may include, after the AD converter (ADC) 47, a digital gain applying unit that amplifies the digital signal to output the digital-gain applied output signal to the signal correction device 32. This enables an appropriate correction of a digital input signal.

Alternatively, the input signal to the signal correction device 32 of the first embodiment may be an analog signal. In the case of inputting an analog input signal, for example, the output signal of a programmable gain amplifier (PGA), which amplifies the analog signal, may serve as the input signal of the signal correction device 32. The input signal to the signal correction device 32 may be other than the output signal of the PGA as long as the input signal is an analog signal. For example, the signal before being amplified by the PGA may serve as the input signal. This enables an appropriate correction of the input analog signal.

Second Embodiment

A second embodiment will be now described.

The second embodiment is different form the first embodiment in adjusting the amplitude after completion of the phase adjustment. The second embodiment will omit the same features as those of the first embodiment and describe features different from those of the first embodiment.

After amplitude adjustment of a correction signal with a phase shift between noise superimposed on a digital image signal (input signal) output from the AFE 31 and the correction signal, the relationship between increase and decrease in the amplitude of the correction signal and decrease in the amount of noise becomes non-linear, which may cause a minimal amount of uncorrected noise corresponding to the amount of phase shift. In view of this, the second embodiment adjusts the correction signal in amplitude after completion of the phase adjustment described in the first embodiment referring to FIG. 11.

Figure 15:
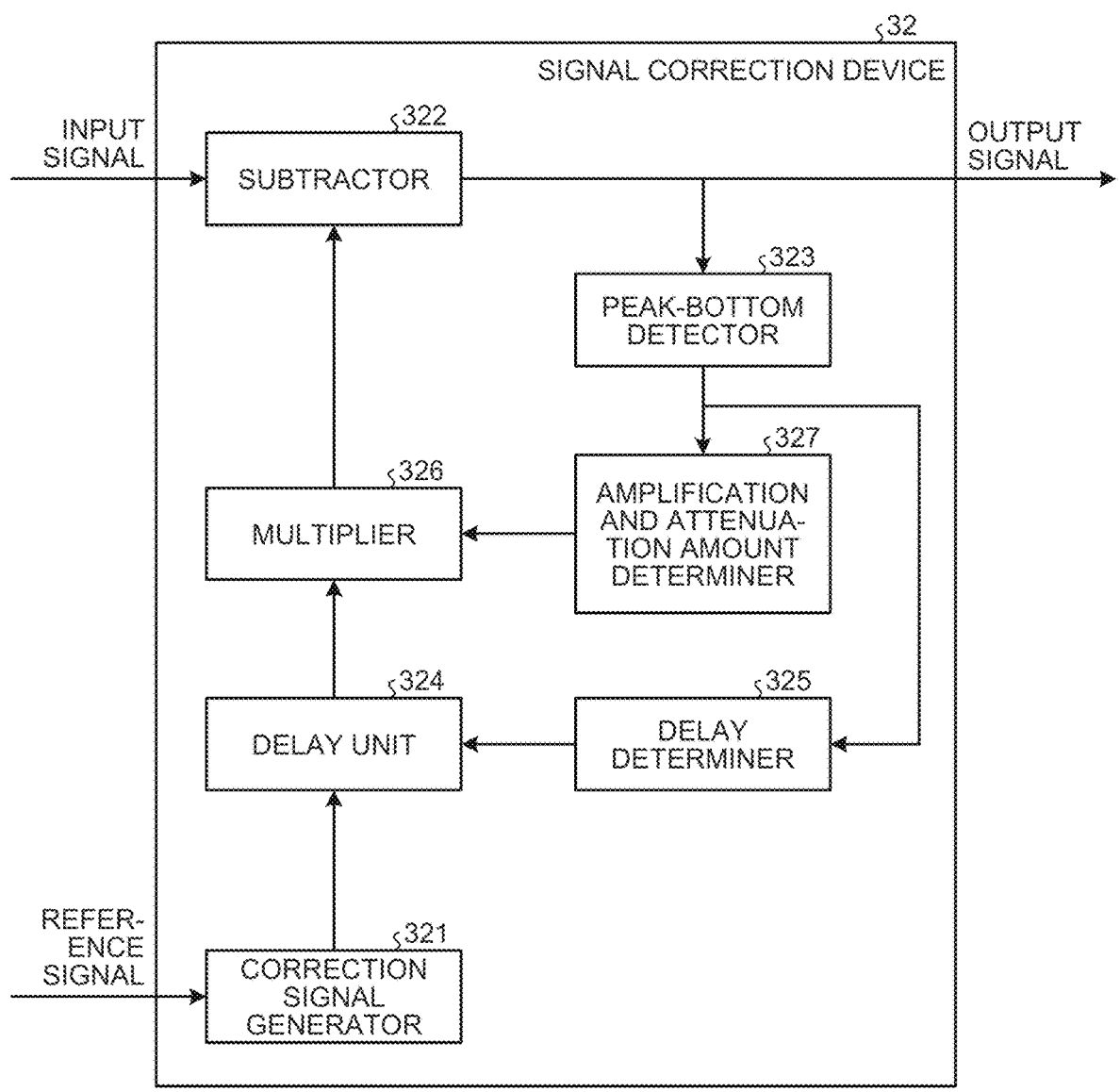
FIG. 15 is a block diagram illustrating a functional configuration of a signal correction device according to a second embodiment.

FIG. 15 is a block diagram illustrating a functional configuration of the signal correction device 32 according to the second embodiment. As illustrated in FIG. 15, the signal correction device 32 includes a multiplier 326 and an amplification and attenuation amount determiner 327, in addition to the elements illustrated in FIG. 4.

The multiplier 326 multiplies the correction signal from the delay unit 324 for amplitude amplification or attenuation.

The amplification and attenuation amount determiner 327 determines an amount of amplification or attenuation of the multiplier 326.

FIG. 15 depicts an example that the output of the delay unit 324 is input to the multiplier 326. However, the delay unit 324 and the multiplier 326 may have an inverse positional relationship as long as the delay determiner 325 and the amplification make their determinations in the same order.

For example, the amplification and attenuation amount determiner 327 may determine the amount of amplification or attenuation after the delay determiner 325 determines a delay. Thus, adjusting phase and amplitude in this order enables more accurate noise correction.

Figure 16:
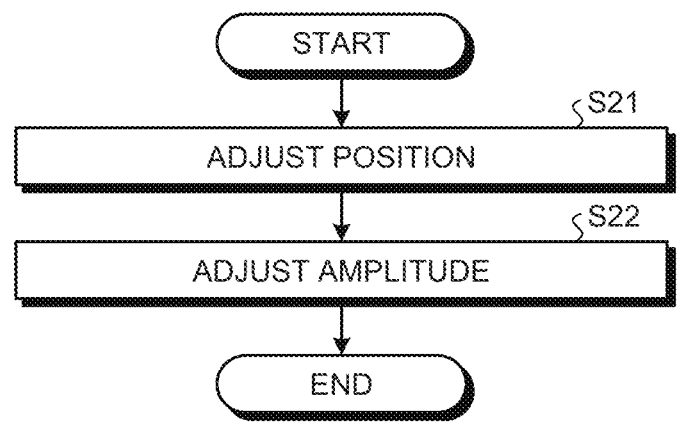
FIG. 16 is a flowchart illustrating phase adjustment of a correction signal by the signal correction device.

FIG. 16 is a flowchart illustrating the process of adjusting the phase of a correction signal by the signal correction device 32. As illustrated in FIG. 16, the signal correction device 32 adjusts the correction signal in amplitude (step S22) after completing the phase adjustment described in the first embodiment referring to FIG. 1 (step S21).

At step S22, after the delay determiner 325 determines a delay, the amplification and attenuation amount determiner 327 determines the amount of amplification or attenuation of the correction signal.

Figure 17:
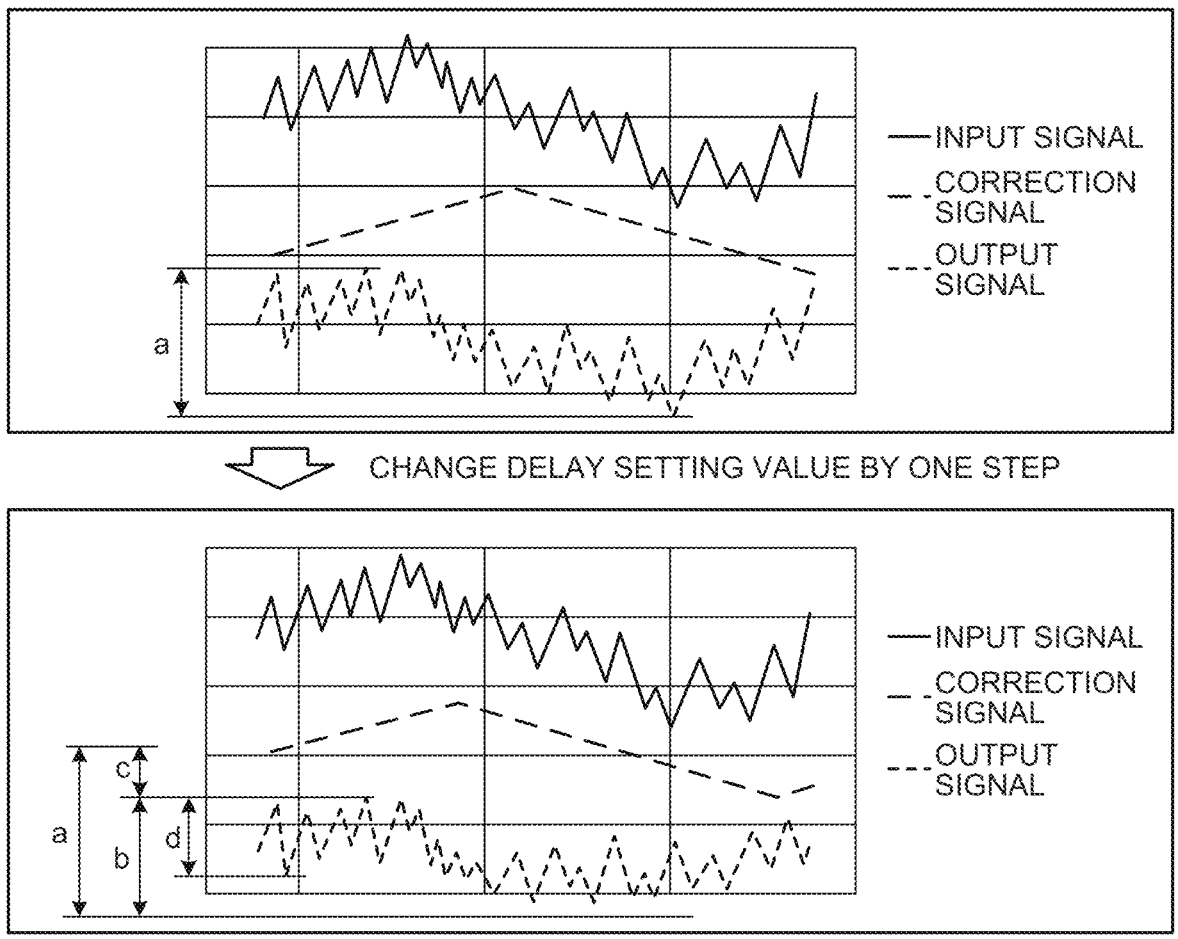
FIG. 17 is a diagram illustrating an influence of disturbance noise caused by a small amount of change in uncorrected noise.

FIG. 17 is a diagram illustrating an influence of disturbance noise caused by a small amount of change in uncorrected noise. As illustrated in FIG. 17, at the time of phase adjustment, a too small change in the uncorrected noise due to a change of the delay may be hidden by disturbance, such as electric noise superimposed on an input signal, which may make an appropriate adjustment unfeasible. FIG. 17 illustrates an example that the width of disturbance noise is larger than the amount of change in uncorrected noise. In this case, it may be not possible to appropriately determine whether the change in uncorrected noise before and after the change of the delay is caused by the change of the delay or the disturbance noise, which may result in an erroneous correction or an excessive correction.

FIG. 18 is a diagram illustrating a decrease in influence of disturbance noise by amplification of a correction signal. As illustrated in FIG. 18, when changing the delay, the signal correction device 32 of the second embodiment amplifies or attenuates the amplitude of the correction signal to a certain magnitude using the multiplier 326 such that the change in the uncorrected noise caused by the change of the delay is not hidden by the disturbance.

According to the second embodiment, as described above, setting the amplitude of the correction signal to a certain magnitude at the time of phase adjustment prevents the change in the amount of noise caused by the phase adjustment from being hidden by random noise. Thereby, the signal correction device 32 reduces the influence of uncorrected noise caused by a phase shift. Irrespective of a disturbance superimposed on an input signal, thus, the signal correction device 32 can detect a change in uncorrected noise caused by a change of the delay and appropriately make a phase adjustment, to be able to accurately correct noise.

Third Embodiment

A third embodiment will be described.

The third embodiment is different from the first embodiment and the second embodiment in that the signal correction device 32 includes the delay unit 324 in common for all the colors (red, green, and blue) of the CCD (CCD linear image sensor) 25, and determines not to change the delay for the other colors after determining not to change the delay for one of the colors. The third embodiment will omit describing the same features as those of the first embodiment and the second embodiment and describe different features from those of the first embodiment and the second embodiment.

Typical image reading devices include image sensors of three colors of R, G, and B to separately generate three-color images and perform image processing to the images of the three colors at a subsequent stage. For this reason, image reading devices mostly include signal processing units, such as a PGA 46 and an ADC 47, for the three colors. The same applies to the signal correction device 32, however, the signal correction device 32 including signal processing units for the three colors is increased in circuit scale, increasing the cost.

In view of this, the signal correction device 32 can include part of the processing units in common for the three colors, making it possible to avoid increase in circuit scale and cost. For example, the delay unit 324 of the signal correction device 32 can be used in common for the three colors to avoid a cost increase.

In the case of using the delay unit 324 in common for the three colors and changing the delay for the three colors with different phase shifts, for example, a phenomenon that the uncorrected noise decreases in a certain color but increase in another color may occur. In this case, determining a delay for each color makes it impossible to find a delay setting that reduces uncorrected noise for all the colors, which causes the correction process to become an infinite loop.

FIG. 19 is a flowchart illustrating a phase adjustment of a correction signal by the signal correction device 32 according to the third embodiment. As illustrated in FIG. 19, the signal correction device 32 of the third embodiment includes the delay unit 324 in common for the three colors (red, green, and blue) of the CCD (CCD linear image sensor) 25, and the peak and bottom detector 323 detects uncorrected noise in each color (steps S12 and S16).

The comparator 3253 of the signal correction device 32 compares first uncorrected noise (uncorrected noise after a change of the delay) stored in the first storage 3251 and second uncorrected noise (uncorrected noise before the change of the delay) stored in the second storage 3252 (step S18). After determining not to change the delay for one of the colors, the comparator 3253 of the signal correction device 32 determines not to change the delay for the other colors (NO at step S18).

As described above, according to the third embodiment, the signal correction device 32 can separately determine to change or not to change the delay for the colors of the CCD (CCD linear image sensor) 25, which can prevent the correction process from fall into an infinite loop.

In the example illustrated in FIG. 19, the CCDs of three colors of red, green and blue are described. In the case of using image sensors that generate images of different colors, the delay determination method of the embodiment may be applied to each corresponding color.

The above-described embodiments have described the example that the image processing device of the present invention is applied to a multi-function peripheral including at least two of the copy function, the printer function, the scanner function, and the facsimile function. The image processing device is applicable to any image forming apparatus, such as a copier, a printer, a scanner, or a facsimile machine.

The present invention can advantageously correct noise superimposed on a signal to correct appropriately, irrespective of a change in phase shift between noise and a correction signal due to the influence of temperature or over time.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A signal correction device comprising:
   a correction signal generator configured to generate a correction signal serving to remove noise superimposed on an input signal;
   a phase adjuster configured to shift a phase of the correction signal generated by the correction signal generator;
   a subtractor configured to generate an output signal for output by subtracting the correction signal from the phase adjuster from the input signal;
   a peak and bottom detector configured to detect a peak value and a bottom value of the output signal; and
   a determiner configured to determine an amount of phase shift of the phase adjuster from the peak value and the bottom value of the output signal detected by the peak and bottom detector, wherein
   the determiner detects uncorrected noise from the peak value and the bottom value of the output signal output from the subtractor, and sets the amount of phase shift such that the uncorrected noise is reduced to a minimum, and
   wherein the determiner comprises:
   a first storage that stores first uncorrected noise detected from the output signal corrected by the correction signal before the change of the amount of phase shift;

a second storage configured to store second uncorrected noise detected from the output signal corrected by the correction signal after the change of the amount of phase shift; and a comparator configured to compare the first uncorrected noise stored in the first storage and the second uncorrected noise stored in the second storage, wherein the comparator determines whether to change the amount of phase shift on the basis of a result of the comparison.

2. The signal correction device according to claim 1, wherein the phase adjuster changes the amount of phase shift in unit of a step of a preset width such that the phase of the correction signal delays.

3. The signal correction device according to claim 2, wherein the preset step width of the phase adjuster is set to twice as large as a minimum setting value of the amount of phase shift and equal to or less than a maximum setting value in an allowable range of uncorrected noise caused by a remaining phase shift.

4. The signal correction device according to claim 1, further comprising:

a multiplier configured to multiply an amplitude of the correction signal for amplification or attenuation;

an amplification and attenuation amount determiner configured to determine an amount of amplification or attenuation of the multiplier, wherein the amplification and attenuation amount determiner determines the amount of amplification or attenuation after the determiner determines the amount of phase shift.

5. The signal correction device according to claim 4, wherein the multiplier amplifies the amplitude of the correction signal for detection of the uncorrected noise such that a variation in the uncorrected noise due to the change of the amount of phase shift is not hidden by disturbance.

6. The signal correction device according to claim 1, wherein the input signal is a digital signal.

7. The signal correction device according to claim 1, wherein the input signal is an analog signal.

8. An image reading device comprising:

an image sensor on which light reflected by a document is incident; and the signal correction device according to claim 1 that receives an input signal from the image sensor.

9. The image reading device according to claim 8, wherein the image sensor comprises, for each color of light to receive, a plurality of pixels one-dimensionally arrayed, the signal correction device comprises the determiner for each color of the light, and comprises the phase adjuster in common for all the colors of the light, and the determiner determines not to change the amount of phase shift for all the colors after determining not to change the amount of phase shift for any of the colors.

10. The image reading device according to claim 8, wherein the image sensor comprises, for each color of light to receive, a plurality of pixels one-dimensionally arrayed, and the signal correction device comprises the determiner and the phase adjuster for each color of the light, and the determiner includes the first storage and the second storage for each color and determines for each color whether to change the amount of phase shift of the correction signal.

11. The image reading device according to claim 8, wherein the signal correction device corrects the correction signal in response to every power-on of the image reading device.

12. The image reading device according to claim 8, wherein the signal correction device corrects the correction signal in response to every scanning operation of the image reading device.

13. The image reading device according to claim 8, wherein the signal correction device corrects the correction signal each time the image reading device recovers from an energy-saving mode to a stand-by mode.

14. An image processing apparatus comprising:

the image reading device according to claim 8; and an image forming unit.

15. A signal correction method to be executed by a signal correction device, the method comprising:

generating a correction signal serving to remove noise superimposed on an input signal;

shifting a phase of the generated correction signal;

generating an output signal for output by subtracting the correction signal from the input signal;

detecting a peak value and a bottom value of the output signal; and determining an amount of phase shift from the detected peak value and bottom value of the output signal, wherein the determining comprises detecting uncorrected noise from the peak value and the bottom value of the output signal, and setting the amount of phase shift of the correction signal such that the uncorrected noise is reduced to a minimum, and the determining comprises:

storing first uncorrected noise detected from the output signal corrected by the correction signal before the change of the amount of phase shift in a first storage;

storing second uncorrected noise detected from the output signal corrected by the correction signal after the change of the amount of phase shift in a second storage; and comparing the first uncorrected noise stored in the first storage and the second uncorrected noise stored in the second storage using a comparator, wherein the comparator determines whether to change the amount of phase shift on the basis of a result of the comparison.

16. A computer program product comprising a non-transitory computer readable medium including programmed instructions, wherein the instructions, when are executed by a computer mounted on a signal correction device connectable to a server via a network, cause the computer to execute:

generating a correction signal serving to remove noise superimposed on an input signal;

shifting a phase of the generated correction signal;

generating an output signal for output by subtracting the correction signal from the input signal;

detecting a peak value and a bottom value of the output signal; and determining an amount of phase shift from the detected peak value and bottom value of the output signal, wherein the determining comprises detecting uncorrected noise from the peak value and the bottom value of the output signal, and setting the phase shift amount of the correction signal such that the uncorrected noise is reduced to a minimum, and the determining comprises:

storing first uncorrected noise detected from the output signal corrected by the correction signal before the change of the amount of phase shift in a first storage;

storing second uncorrected noise detected from the output signal corrected by the correction signal after the change of the amount of phase shift in a second storage; and comparing the first uncorrected noise stored in the first storage and the second uncorrected noise stored in the second storage using a comparator, wherein the comparator determines whether to change the amount of phase shift on the basis of a result of the comparison.

* * * * *